Figures 1, 2A, 2B, 2C:
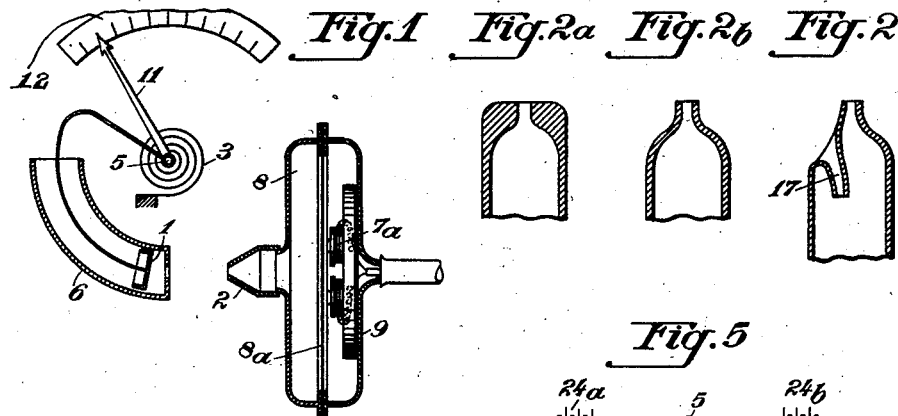

Sept. 29, 1925.                                                                1,555,318
H. SELL
MEASURING DEVICE
Filed Oct. 30, 1923

Inventor:
Helmut Sell
by Hughes Bros
his attys.

Patented Sept. 29, 1925.

1,555,318

UNITED STATES PATENT OFFICE.

HELMUT SELL, OF SIEMENSSTADT, NEAR BERLIN, GERMANY, ASSIGNOR TO SIEMENS & HALSKE AKTIENGESELLSCHAFT, OF SIEMENSSTADT, NEAR BERLIN, GERMANY, A CORPORATION OF GERMANY.

MEASURING DEVICE.

Application filed October 30, 1923. Serial No. 671,770.

*To all whom it may concern:*

Be it known that I, HELMUT SELL, a citizen of the German Empire, residing at Siemensstadt, near Berlin, Germany, have invented certain new and useful Improvements in Measuring Devices, of which the following is a specification.

My invention relates to a device or appliance for measuring sound energy or electric values determining such energy.

My invention is based upon the discovery or observation that oscillations of a gaseous medium are distorted in a peculiar manner when passing through a narrow orifice, for instance the opening of a nozzle. It has been ascertained that at some places of the space at the back of the nozzle the amplitude of the waves or oscillations is reduced in an extraordinary degree and at other places it is greatly increased. My invention utilizes this fact in the measuring of the various values. According to my invention a movable indicating element, for instance a pointer mechanism, the deflection of which is a measure for the intensity of the oscillations of the gaseous medium emanating from the oscillating element is disposed at the places of the space at the back of the outlet opening, where the amplitude of the oscillations reaches a particularly high value.

Several embodiments of my invention are shown diagrammatically in the accompanying drawings by way of example. The drawings illustrate in Fig. 1 the combination of a telephone receiver, a stationary nozzle mounted upon the casing of said telephone receiver and a pointer mechanism, Figs. $2^a$, $2^b$, $2^c$ details of construction in stationary nozzles, Fig. 3 the combination of an electromagnet with spring-controlled armature, a movable nozzle and a pointer mechanism, Fig. 4 the combination of two telephone receivers with two stationary nozzles and a pointer mechanism, which is adapted in each of its end positions to close a relay circuit and Fig. 5 the combination of two electromagnets with spring-controlled aramatures, two movable nozzles and a pointer mechanism adapted to close a relay circuit in each of its end positions.

Similar parts are indicated by the same reference characters throughout all the figures of the drawings.

Referring to Fig. 1, it will be seen that the oscillations or waves of a gaseous medium act upon a disc or light piston 1 and adapted to move in a circular cylinder 6 and connected with a spring-controlled pointer, so that the value of the force may be read off on the scale 12 by the deflection of the pointer. Upon the casing 9 of a telephone receiver 8 is placed a nozzle 2. If an alternating current is passed through the coils $7_a$ of the telephone, the diaphragm $8_a$ is set into oscillations which are transmitted through the gaseous medium and after passing through the nozzle 2 act upon the piston 1. The nozzle 2 is arranged at an appropriate distance in front of the mouth of the cylinder 6, as the distribution of the areas of positive and negative pressure depend upon the position of the nozzle.

The construction of the nozzle is naturally of great importance for the action of the apparatus. In the Figs. $2^a$, $2^b$, $2^c$ suitable constructions of stationary nozzles are shown in cross-section. It is an inherent feature of nozzles that the forward and backward flow of the particles of air cannot take place in the same manner. While during the escape of the air the path of the air through the opening of the nozzle through which every escaping particle of air is obliged to pass is prescribed, all backwards flowing particles will by no means enter the opening again. According to the shape of the outer surface the return flow will take place along other paths, just as the internal shape and configuration of the nozzle determines the shape of the issuing jet. All the figures show the same shape of the internal walls, while the shape of the external walls changes. In Fig. $2^c$ a funnel-shaped insertion 17 is provided inside the nozzle, which has comparatively very little effect during the escape of the air, but which facilitates the return of the air into the nozzle owing to the partial vacuum set up in the interior of the nozzle.

Figure 3:
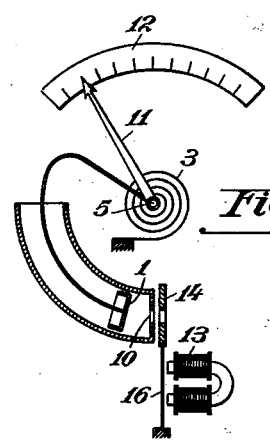

Fig. 3 illustrates a combination of the oscillatory element 16 excited by an electromagnet 13 and provided with a perforated element 14, which is constructed in the manner of a shutter. The oscillatory element 16 has the form of a leaf spring fixed at one end. This flat spring carries the element 14 which in cooperation with the small orifice in the end plate 10 of the circular cylinder 6 acts upon the piston 1 of the pointer mechanism. Otherwise the appliance corresponds with the one shown in Fig. 1.

Figure 4:
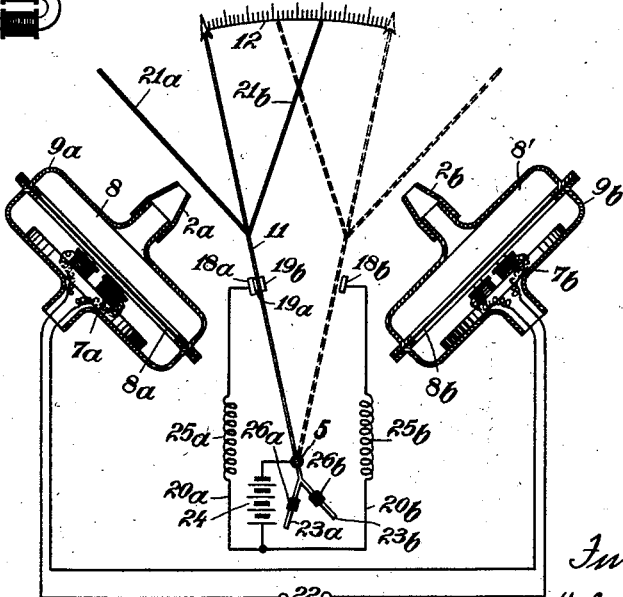

In the device illustrated in Fig. 4 two impact surfaces $21_a$, $21_b$ are firmly fixed upon the pointer 11 which may turn about the spindle 5. The action of gravity upon the pointer is counterbalanced by two weights $26_a$, $26_b$ arranged adjustably upon extension arms $23_a$, $23_b$ of the pointer 11. The pointer is shown in one end position, the other being indicated by broken lines. Two sources of sound are provided in the form of the diaphragms $8_a$, $8_b$ of two telephones receivers, 8, $8^1$, the exciter coils $7_a$, $7_b$ of which are connected in series and joined to the line terminals 22. Stationary nozzles $2_a$, $2_b$ are mounted upon the casings $9_a$, $9_b$ of the telephone receivers. The oscillations of the gaseous mediums emanating from the diaphragm $8_a$ act after their passage through the nozzle $2_a$ on the impact surface $21_a$ of the pointer 11, while the oscillations emanating from the diaphragm $8_b$ act upon the impact surface $21_b$. As the oscillations of both diaphragms are affected to the same extent by fluctuations of the line voltage, the position of the pointer upon the scale 12 remains unchanged, if the telephone receivers correspond exactly with each other. If, however, the natural frequencies of the diaphragms $8_a$, $8_b$ are slightly out of tune in relation to each other, the pointer 11 moves across the scale 12 during frequency fluctuations of the line voltage.

Upon the pointer 11 there are, furthermore, fixed contacts $19_a$, $19_b$ adapted to co-operate with countercontacts $18_a$, $18_b$. In each end position of the pointer relay circuits $20_a$, $20_b$ with a common feeder battery 24 are closed by the said contacts. In the position of the pointer shown the circuit is, for instance, closed and the current flows from the battery 24 across the pointer spindle 5, the pointer 11, contact $19_a$, contact $18_a$, and the relay $25_a$ back to the other pole of the battery 24. These relays may be employed for the control of any operations.

In this arrangement the ratio of the forces of the oscillations emanating from the two diaphragms effects the adjustment of the pointer.

Figure 5:
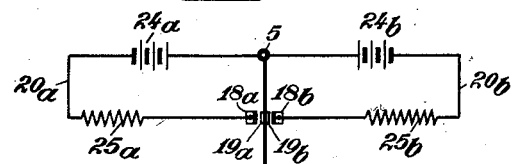

In Fig. 5 an apparatus is shown, in which the difference of the forces of the oscillating medium affects the adjustment of the pointer 11. Upon the pointer 11, which is rotatably suspended upon the spindle 5, is fixed at the lower end a disc $1_a$. This disc $1_a$ is situated between two movable bodies $14_a$, $14_b$ acting like nozzles, which are fixed upon two leaf springs $16_a$, $16_b$. The leaf springs $16_a$, $16_b$, the natural frequencies of which differ somewhat from each other, are firmly clamped at their other ends and stand under the influence of the electro-magnets $13_a$, $13_b$. The electro-magnets $13_a$, $13_b$ are connected in series and an alternating current source for their excitation is assumed to be connected at 22. The electro-magnets set the leaf springs $16_a$, $16_b$ into oscillations and the gaseous medium passing through the fixed nozzles affects the adjustment of the pointer. Upon the pointer are fixed contacts $19_a$, $19_b$, which in cooperation with countercontacts $18_a$, $18_b$ are adapted to close a relay circuit $20_a$, $20_b$, which is fed by the batteries $24_a$, $24_b$. The relays $25_a$, $25_b$ may be employed to control any desired operations.

The devices illustrated in the drawings by way of example may, for instance, be useful for measuring especially small sound energies. The strength of the sound may, however, also be employed as a measure for the frequency of alternating currents, the intensity of alternating currents or interrupted continuous currents and similar values. It will be understood that instead of the pointer a ray of light may be employed as indicator and that various changes may be made in the device by those skilled in the art without departing from the spirit of the invention or sacrificing any of its advantages.

What I claim as my invention and desire to secure by Letters Patent is:—

1. In a measuring device, the combination of an element adapted to be set into oscillation and arranged in a gaseous medium, a body containing a small orifice through which owing to the movement of said oscillating element the said gaseous medium is adapted to be forced in the form of a jet and an indicating element movably disposed at some distance in front of said orifice distinctly within the zone of said jet, within which the jet energy alone is effective.

2. In a measuring device, the combination of an element adapted to be set into oscillation by an electric current and disposed in a gaseous medium, a body containing a small orifice through which owing to the movement of said oscillating element the said gaseous medium is adapted to be forced in the form of a jet and an indicating element movably disposed at some distance in front of said orifice distinctly within the zone of said jet, within which the jet energy alone is effective.

3. In a measuring device, the combination of a magnetic element adapted to be set into oscillation and arranged in a gaseous medium, an electro-magnet the variable magnetic field of which is adapted to set said magnetic element into oscillation, a body containing a small orifice through which owing to the movement of said oscillating element the said gaseous medium is adapted to be forced in the form of a jet and an indicating element movably disposed at some distance in front of said orifice distinctly within the zone of said jet, within which the jet energy alone is effective.

4. In a measuring device, the combination of a magnetic element adapted to be set into oscillation and arranged in a gaseous medium, an electro-magnet the variable magnetic field of which is adapted to set said magnetic element into oscillation, a nozzle through which owing to the movement of said oscillating element the said gaseous medium is adapted to be forced in the form of a jet and an indicating element movably disposed at some distance in front of said nozzle distinctly within the zone of said jet, within which the jet energy alone is effective.

5. In a measuring device, the combination of a telephone receiver the diaphragm of which is arranged in a gaseous medium and adapted to be set into oscillation by alternating currents passing through the exciter coils of said telephone receiver, a nozzle through which owing to the movement of said oscillating element the said gaseous medium is adapted to be forced in the form of a jet and an indicating element movably disposed at some distance in front of said nozzle distinctly within the zone of said jet, within which the jet energy alone is effective.

6. In a measuring device, the combination of a telephone receiver the diaphragm of which is arranged in a gaseous medium and adapted to be set into oscillation by alternating currents passing through the exciter coils of said telephone receiver, a casing detachably mounted on the casing of the telephone receiver, a nozzle in said detachable casing, so that owing to the oscillations of said diaphragm the said gaseous medium is forced in the form of a jet through said nozzle, and an indicating element movably disposed at some distance in front of said nozzle distinctly within the zone of said jet, within which the jet energy alone is effective.

7. In a measuring device, the combination of two elements adapted to be set into oscillation and arranged in a gaseous medium, two electro-magnets adapted to set said elements into oscillation by means of the variations of the intensities of their magnetic field, two bodies containing small orifices through which said gaseous medium is adapted to be forced in the form of jets owing to the oscillations of said elements and an indicating element disposed between said orifices and distinctly within a zone in which said two jets alone exert forces directed in opposite senses.

8. In a measuring device, the combination of two elements adapted to be set into oscillation, said elements having natural frequencies differing from each other and being arranged in a gaseous medium, two electro-magnets adapted to set said elements into oscillation by means of the variations of the intensities of their magnetic field, two bodies containing small orifices through which said gaseous medium is adapted to be forced in the form of jets owing to the oscillations of said elements and an indicating element disposed between said orifices and distinctly within a zone in which said two jets alone exert forces directed in opposite senses.

9. In a measuring device, the combination of two telephone receivers arranged in a gaseous medium, the diaphragm of said receivers being adapted to be set into oscillation by means of alternating currents exciting the coils of said receivers, two nozzles through which said gaseous medium is adapted to be forced in the form of jets owing to the oscillations of said diaphragms, and an indicating element disposed between said nozzles and distinctly within a zone in which said two jets alone exert forces directed in opposite senses.

10. In a measuring device, the combination of two telephone receivers arranged in a gaseous medium and the diaphragms of which are adapted to be set into oscillation by alternating currents exciting the coils connected in series of said telephone receivers, two nozzles through which said gaseous medium is adapted to be forced in the form of jets owing to oscillations of said diaphragms, and a pointer mechanism disposed between said telephone receivers and adapted to be operated by the differential of the power of the jets of said medium.

11. The method of indicating gas-oscillation by mechanical movement consisting of directing the oscillating gas through a narrow orifice in form of a jet and operating a mechanical element arranged at some distance before said orifice and distinctly within the zone of the jet within which the jet energy alone is effective.

In testimony whereof I affix my signature.

HELMUT SELL.